July 12, 1960   M. H. EASY   2,945,223
RADAR DISPLAYS
Filed Sept. 10, 1956   4 Sheets-Sheet 2

Fig. 7.

United States Patent Office 2,945,223
Patented July 12, 1960

2,945,223

RADAR DISPLAYS

Maurice Henry Easy, London, England, assignor to The Decca Record Company Limited, London, England, a British company Filed Sept. 10, 1956, Ser. No. 608,729

21 Claims. (Cl. 343—6)

This invention relates to radar plan positions displays on ships or other craft.

It is known to stabilise plan position indicator displays on aircraft, that is to say, to keep the echoes from ground returns stationary on the screen of a cathode ray tube despite the movement of the aircraft, by stabilising the display in azimuth using a compass repeater to rotate the cathode ray beam deflection coils and by applying to the cathode ray beam deflection system signals representative of the speed and direction of movement of the aircraft.

Particularly in ships and other marine craft, signals representative of the speed and of the direction of heading of the craft through the water may not be sufficiently accurate as a measure of the track and true speed of the craft with respect to the ground. It is an object of the present invention to provide an improved form of stabilised radar display overcoming this disadvantage.

According to this invention there is provided, in combination in a ship or other craft, radar apparatus having a cathode ray tube plan position indicator and a radio position fixing system, the position fixing system being arranged to control deflection means for deflecting the centre of rotation of the trace on the screen of the cathode ray tube in accordance with the movement of the craft so as to stabilise the display against displacement thereof on the screen due to the motion of the craft. This arrangement makes it possible to provide accurate stabilisation of the display quite irrespective of any difference between the course steered and the track made by the craft. Accurate stabilisation is of particular advantage in marine navigation since, if echoes from fixed objects are completely stabilised, they will not smudge on the screen and it is therefore much more readily possible to distinguish echoes of fixed objects such as buoys from echoes of moving targets. Furthermore, accurate stabilisation in this manner enables the true track of other ships to be determined from the radar indicator which is not possible with displays stabilised by means of a log or other device for measuring speed through the water.

The radar display may be stabilised in bearing by means of a compass, thereby forming what is known as a compass-datum stabilised display. In this case the deflection means may comprise two fixed beam deflectors (e.g. shift coils) for deflecting the centre of rotation of the trace respectively in two different directions and computing means may be provided for converting positional data from the radio position-fixing system into deflection signals for application to said fixed beam deflectors. In another arrangement for a compass-datum stabilised display, said deflection means may comprise two beam deflectors separately rotatably mounted with respect to the cathode ray tube whereby the beam deflectors may be positioned in accordance with the directions of two positional co-ordinates determined by the position fixing system and computing means may be provided for converting the positional co-ordinates into deflection signals for application to said beam deflectors. In yet another arrangement for a compass-datum stabilised display, said deflection means comprise beam deflector means for effecting radial deflection of the beam in one direction, which deflector means are mounted on a member rotatable about the neck of the tube and computing means are provided for converting positional data from the radio position-fixing system into deflection signals for application to said beam deflector means and for controlling the angular direction of said radial deflection by rotational movement of said member.

Alternatively, instead of being compass-datum stabilised, the radar display may be a relative display, that is to say the direction of heading of the craft always remains as the same direction on the display screen. Such relative displays are often preferred for marine navigation, particularly when the radar is used for collision warning. In such relative displays, the aforementioned deflection means may be mounted externally on the cathode ray tube on a member arranged to be rotated about the neck of the tube in accordance with changes of the heading of the craft so that the centre of rotation of the trace is always deflected in the appropriate direction. In one arrangement, the deflection means may comprise two beam deflectors, which are fixed with respect to said member, for deflecting the centre of rotation of the trace respectively in two different directions and computing means are provided for converting positional data from the radio position-fixing system into deflection signals for application to said beam deflectors. In an alternative arrangement for a relative display the deflection means may comprise two beam deflectors separately rotatably mounted on said member for rotation about the neck of the cathode ray tube, whereby the beam deflectors may be positioned in accordance with the direction of two positional co-ordinates determined by the position fixing system and computing means are provided for converting the positional co-ordinates into deflection signals for application to said beam deflectors. In either of these arrangements for a relative display, compass controlled means may be provided for rotating said member in accordance with the changes in the heading of the craft as determined by a compass or means controlled by said position fixing system may be provided for rotating said member in accordance with changes in direction of movement of the craft determined by said position fixing system.

With a relative display as described above, so long as the craft remains on a constant course, echoes from fixed objects, such as buoys, will remain in fixed positions on the screen. Means may be provided for rotating the cathode ray tube and its scanning deflector means in synchronism with the rotation of said member, as is described in United States application No. 596,665 so that echoes from fixed objects will remain in fixed positions on the screen of the tube and hence will not smudge even if the direction of the heading of the craft is altered. Thus the advantage of accurate stabilisation of the display in the form of freedom from smudging of fixed echoes can be obtained both on a relative display and on an azimuth stabilised display.

For some purposes it may be desirable to use, on a ship, a radar display which can be stabilised by feeding into deflector means a signal proportional to the speed of the ship. In the case of a relative display, one such deflector means may be provided which deflector means may be fixed to effect deflection in the direction of heading of the craft or alternatively the single deflector system may be adjustable in position so that it may be set to deflect the centre of rotation of the trace on the screen radially in the direction of the track of the craft. It will be appreciated that the track of the craft will not necessarily coincide in direction with the heading of the craft due to sideways drift. This single deflector system may then be fed with a single signal from the radio position fixing system which changes at a rate proportional to the ship's true speed in the appropriate direction. For this purpose computing means may be provided for converting positional data of two positional co-ordinates determined by the radio navigation system into deflector signals for application to said single deflector system or the computing means may be arranged for converting positional data of a single positional co-ordinate determined by the radio navigation system together with compass data representative of the heading of the vessel into deflection signals for application to said single deflector system.

The aforementioned computing means in any of the above described arrangements may conveniently comprise a mechanical analogue computer.

It will be appreciated that all radio position fixing systems provide a position fix by defining two or more co-ordinates such as, for example, range and bearing from a fixed point or co-ordinate positions on the hyperbolic lattice. For the purpose of the present invention it is necessary to use a position fixing system which will define the position quite accurately on the scale of the radar display and, for this purpose, a hyperbolic phase comparison radio navigation system such as for example, that known as the "Decca Navigator System" is particularly suitable. Over a small area such as would be covered by the radar display the hyperbolic lattice lines would be substantially straight and the ratio between the distance moved and change of lattice co-ordinate would be substantially constant. The signals representative of the changes in the co-ordinate magnitudes may be derived, for example, from potentiometers which are mechanically adjusted in accordance with these co-ordinates. Such potentiometers may quite readily be controlled by a servo system similar to that used for driving an automatic chart position indicator. Reference may be made to the specification of British Patent No. 665,135 for a description of one such form of automatic chart position indicator which could readily be adapted to control two such potentiometers. The position fixing system may be used to alter the position of taps on each potentiometer, and the total voltage across the potentiometers may be adjusted in accordance with the spacings between the appropriate lattice lines of the position fixing system and the scale of the radar display.

Many ships are not fitted with transmitting compasses and, for this reason, utilise radar apparatus having a relative display. With such radar apparatus, for the purposes of the present invention, there may be provided, as described above, a single deflector means arranged for deflecting the display in the direction, on the screen, of the ship's heading. This deflector means may then be fed with a signal, derived from the radio position fixing system, which changes at a rate proportional to the ship's true speed in the direction of the course being steered. In the case of a hyperbolic radio navigation system, such a signal may conveniently be derived from the information determined with respect to one set of lattice lines, the necessary scale factor correction being determined by measuring, on a chart, the distance between successive lattice lines of this set in the direction of the course being steered. It will be seen that this arrangement enables a radar display to be provided which is completely and accurately stabilised with respect to all movement in the direction of the ship's course by relatively simple means, avoiding any requirement for a transmitting compass and azimuth stabilisation.

The following is a description of a number of embodiments of the invention, reference being made to the accompanying drawings in which.

Figure 1:
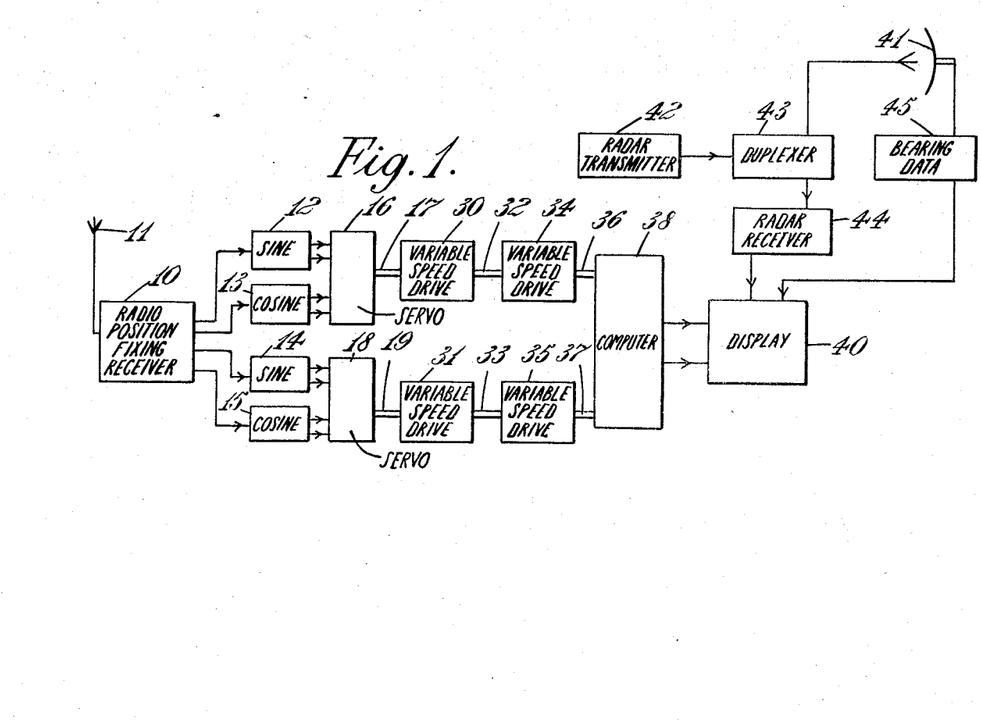
Figure 1 is a block diagram showing one combination of a radar apparatus and a radio position fixing system for stabilising the radar display.
Figure 2:
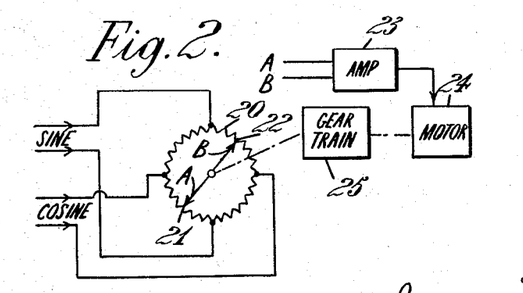
Figure 2 is a diagram illustrating one form of servo-mechanism for use in the arrangement of Figure 1.

Referring to Figure 1 there is illustrated diagrammatically for use on a craft, such as a ship, apparatus for stabilising a radar display. This apparatus includes a radio position fixing receiver 10 coupled to an aerial 11. For the present invention, the position fixing system must determine the position of a craft accurately on the scale of the radar display and, for the purpose of illustration, this position fixing system is assumed to be a hyperbolic phase comparison radio navigation system of the kind known as the "Decca Navigator System." Such a system is described, for example, in British Patent Specification No. 620,479. For the present purposes it is sufficient to state that the system produces four output signals, one pair of output signals being representative of the sine and cosine of the phase relationship between signals radiated from one pair of spaced transmitters and the second pair of output signals being representative of the sine and cosine of the phase relationship between signals transmitted from a second pair of spaced transmitting stations. These two phase relationships may be considered as being representative of the two co-ordinate positions of the receiver with respect to two sets of intersecting hyperbolic lattice position lines. The four output signals are fed respectively into four phase splitters 12, 13, 14, 15 each of which provides two outputs of opposite polarity from its single input. The sine and cosine from the phase splitters 12, 13 are both applied to a first servo mechanism 16 to drive an output shaft 17 to take up an angular position corresponding to the measured phase angle, i.e. corresponding to one co-ordinate of the hyperbolic co-ordinate system. The sine and cosine outputs from the phase splitters 14, 15 are similarly applied to a second servo mechanism 18 to drive an output shaft 19 to take up an angular position corresponding to the measured phase angle i.e. corresponding to the other co-ordinate of the hyperbolic co-ordinate system. One form of servo mechanism suitable for this purpose is illustrated diagrammatically in Figure 2 and comprises a ring of fixed resistors 20 to which are applied, at four evenly spaced fixed tappings, the four input signals, the two sine signals being applied to one pair of diametrically opposite tappings and the two cosine signals being applied to the two other diametrically spaced tappings. A pair of brushes 21, 22, are rotatably mounted so as to be capable of making contact with the ring resistors 20 in two diametrically opposed points. The output from the two brushes is taken by leads A, B to an amplifier 23 where it is amplified and fed to a motor 24 to control the rotation thereof. This motor is coupled to drive the brushes through a suitable gear train 25. The servo-mechanism is arranged so that the motor tends to rotate the brushes to a position in which zero voltage exists between them and hence it will cause the brushes to take up an angular position corresponding to the measured phase angle. As the craft moves, the measured phase angle will change so charging the voltage distribution on the ring resistors and so causing the motor to rotate the brushes. The motor may have a considerable output torque and may thus provide the required output from the servo-mechanism. Referring again to Figure 1, the two servo-mechanisms 16, 18 drive the two output shafts 17, 19 respectively and thus these shafts will be rotated by amounts corresponding to the changes in the two measured phase angles. For further information about such a servo mechanism for providing a rotational movement of output shafts in accordance with the phase comparison made by a receiver of a hyperbolic phase comparison radio navigation system, reference may be made to British patent specification No. 665,135.

Over a small area, such as would be covered by a radar display, the hyperbolic co-ordinate lines of the position fixing system may, in general, be regarded as straight lines. These lines, however, will not usually intersect at right angles and, moreover, the distances represented by a given change of co-ordinate values will generally be different for each of the pair of co-ordinates required for a fix. In the radar display, the scale of the picture may be altered from time to time during operational use. These circumstances may require that auxiliary apparatus be interposed between the position fixing system and the deflection means in the radar set to convert the signals representing co-ordinate values in the position fixing system to signals, mechanical and/or electrical, which when applied to the deflection means in the radar set will reproduce the motion of the craft without distortion on a scale suitable to the picture being displayed. This auxiliary apparatus may be incorporated wholly or partially in a separate unit, or may be incorporated wholly or partially within the radar set and/or the position fixing set. The auxiliary apparatus may be wholly or partially automatic, or wholly or partially manual in processing the signals as required.

For this purpose, the two shafts 17, 19 are coupled respectively to the inputs to two variable speed drives 30, 31 which may conveniently be continously variable speed gears such as ball and double cone arrangements. The drive ratios of each of these two variable speed drives is adjusted manually in accordance with the relationship between the actual distance traversed for each unit change in co-ordinate value for the respective co-ordinate. The two variable speed drives have output shafts 32, 33 which thus rotate by amounts which are in a fixed ratio to the movement of the craft and might for example be expressed in terms of degrees of rotation of a shaft for each mile of travel of the craft in the appropriate direction.

Figure 3:
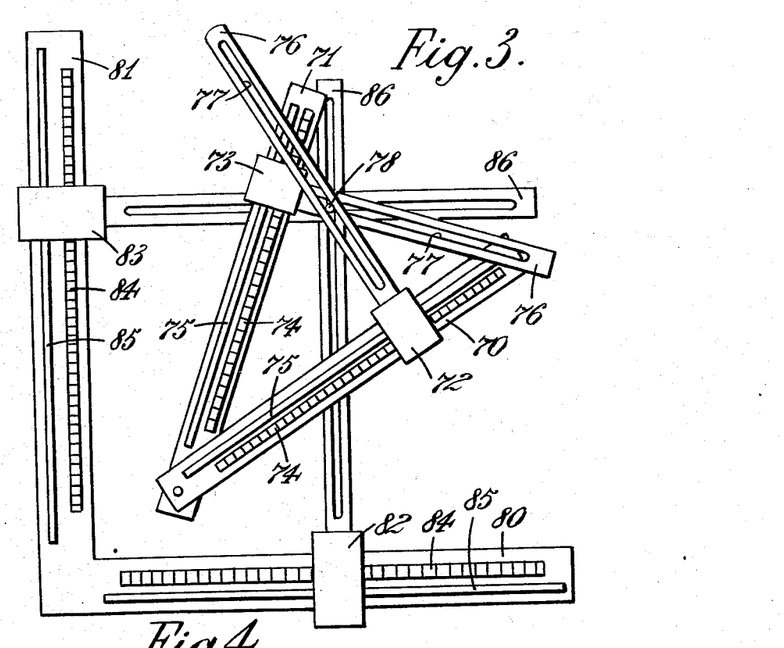
Figure 3 is a diagram illustrating a mechanical analogue computer for use in the arrangement of Figure 1.
Figure 4:
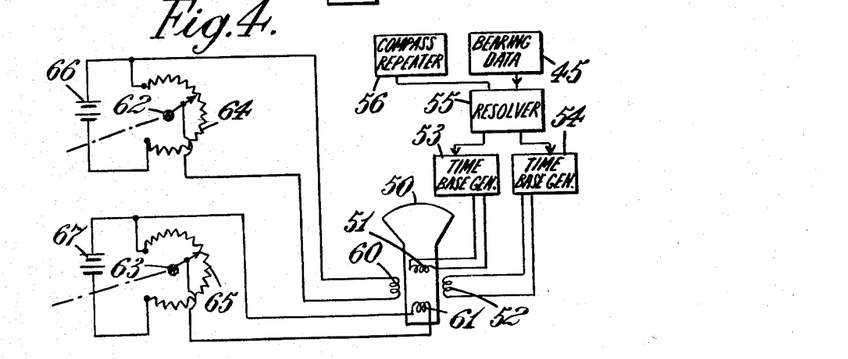
Figure 4 is a diagram illustrating in more detail part of the display apparatus of Figure 1.

It is the general practice on radar displays for means to be provided for altering the scale of the radar picture and, to compensate for such changes in the picture scale, two further variable speed drives 34, 35 are coupled to the shafts 32, 33, these variable speed drives 34, 35 having adjustable ratios under the control of the radar operator. Conveniently these controls will be operated automatically on changing the scale of the radar display. Usually the scale of the radar picture is changed in fixed steps and, in this case, gear ratios of fixed steps might be employed in the variable speed drives 34, 35 but, if a continuously variable radar scale is employed continuously variable gears would be provided. The two variable speed drives 34, 35 have output shafts 36, 37 respectively, the rotation of which may be expressed, for example, as degrees of shaft rotation for each centimetre of movement of the center of rotation of the display trace. These shaft rotations however are representative of required displacements of the trace in the directions determined by the co-ordinate system of the radio position fixing arrangements. These shaft rotations are fed into an electro-mechanical computer 38 in order to provide output signals for application to the deflection means of a radar display 40. The radar system is shown diagrammatically in Figure 1 as comprising a scanning aerial 41 from which are radiated radio frequency pulse signals from a transmitter 42, these signals being fed through a duplexer 43 to the aerial 41. The echo signals received at the aerial 41 pass through the duplexer to a receiver 44 and are thence fed to the aforementioned display 40. There is also illustrated diagrammatically a bearing data transmitter 45 for transmitting the angular position of the aerial to the radar display. The construction of the computer 38 will necessarily depend on the type of display employed and Figure 3 illustrates diagrammatically part of a computer for use with a display system such as is shown in Figure 4 which has a cathode ray tube 50 on the screen of which a compass datum stabilised display is shown. For effecting the scanning of the cathode ray beam to produce the plan position display, that is to say radial scan at the pulse repetition rate of the radar transmitter and angular rotation of the trace in synchronism with the rotation of the aerial, there are provided two fixed coil systems 51, 52 effecting deflections in two directions at right angles, these coil systems being fed respectively with saw-tooth waveforms from two time-base deflectors 53, 54. These time base deflectors are controlled by sine and cosine signals respectively from a resolver 55 to which is fed information both from the bearing data transmitter 45 and from a compass repeater 56 so that the scanning of the cathode ray tube corresponds to that required for a compass datum stabilised display. This form of compass datum stabilised display is described merely by way of example and it will be apparent that other forms of compass stabilised displays might be employed. The display system is provided with two further deflection coil systems 60, 61 for deflection of the cathode ray beam independently in two fixed directions at right angles conveniently corresponding to North-South and East-West on the radar display. The currents through these deflection coil systems and hence the deflections in these two fixed directions are controlled by the rotation of two shafts 62, 63 driving wiper arms of two potentiometers 64, 65 respectively. For the sake of simplicity in the drawing, these potentiometers are shown diagrammatically as being connected in series with batteries 66, 67, the tapped portions of the battery voltages being applied to the two coils 60, 61.

The shafts 62, 63 thus control the movement of the centre of rotation of the radar display scanning and it will be seen that it is required to convert shaft rotations of shafts 36, 37, which represent movements in the co-ordinate directions of the radio position fixing system, into shaft rotations of the shaft 62, 63 representative of Cartesian co-ordinates of the displacement of the centre of rotation of the trace on the screen of the cathode ray tube.

The signals required for conversion from the radio position fixing co-ordinate system to those of a Cartesian co-ordinate deflection means are:

$$X = \frac{C_2 \sin \alpha_1 - C_1 \sin \alpha_2}{\sin (\alpha_2 - \alpha_1)}$$

$$Y = \frac{C_2 \cos \alpha_1 - C_1 \cos \alpha_2}{\sin (\alpha_2 - \alpha_1)}$$

where X is the signal required to be applied to the East-West deflection means,

Y is the signal required to be applied to the North-South deflection means, $C_1$ and $C_2$ are the respective co-ordinate values of the radio position fixing system, corrected for display scale and co-ordinate scale, $\alpha_1$ and $\alpha_2$ are the directions with respect to North made by lines of constant co-ordinate value respectively, in the radio position fixing co-ordinate system.

This computation might be carried out by any one of a number of different types of computer but, for the particular purpose of converting the co-ordinates of a hyperbolic radio position fixing system in the Cartesian co-ordinates it is preferred to use a form of mechanical analogue computer illustrated diagrammatically in Figure 3. Referring to this figure there are shown two guides 70, 71 along which are movable respectively two guided members 72, 73. Extending along each of the guides is a rack 74 and a rotatable shaft 75 which is suitably keyed to drive, for example, through a crown wheel and pinion in the guided member, gear engaging the rack so that, by rotation of the shafts 75, the guided members 72, 73 can be moved along their respective guides distances proportional to the shaft rotations. Mounted on each of the guided members 72, 73 are slotted arms 76 having slots 77 extending outwardly at right angles to the respective guides and lying in parallel adjacent planes. A pin 78 is arranged to extend through the two slots at the point where they cross one another. The two guides 70, 71 may be set into angular position corresponding to the co-ordinate directions of the radio position fixing system and it will thus be seen that, provided the positions of the guided members 72, 73, are appropriately set initially, by driving the shafts 75 from the shafts 36, 37 of Figure 1, then the pin 78 would be moved so that its position always corresponds to a chart position of the craft. To convert this pin movement into Cartesian co-ordinates there is provided a second pair of guides 80, 81 carrying guided members 82, 83, these guides being provided with racks 84 and shafts 85 similar to the aforementioned racks 74 and shafts 75 so that movement of the guided members may be transformed into shaft rotations. The guided members 82, 83 each carry a slotted arm 86 extending at right angles to the direction of the respective guide, these arms lying in planes parallel to the planes of movement of the arms. These arms 86 are initially positioned so that the aforementioned pin 78 passes through the two slots in these arms. It will thus be seen that movement of the pin 78 due to rotation of the shafts 75 will cause movement of the arms 86 and hence corresponding rotations of the shafts 85. These shaft rotations will thus correspond to the movement of the craft in Cartesian co-ordinates and are applied directly to the aforementioned shafts 62, 63 (Figure 4) for controlling the deflection of the centre of rotation of the radar display.

It will thus be seen that the arrangement of Figures 1 to 4 provides a radar display in which the centre of rotation is displaced in a direction and by an amount determined by the radio position fixing receiver 10 so as to stabilise the radar display in position on the display screen. As the display is stabilised also in azimuth by means of a compass, all echoes from fixed objects will remain at fixed points on the screen of the cathode ray tube no matter how the craft moves or changes its heading. This stabilisation materially facilitates the interpretation of the radar picture since echoes from fixed objects will not smudge whereas echoes from moving objects will do so and it thus becomes much easier to distinguish between fixed and moving objects on the display. For a craft operating in a limited area, a chart transparency or the like may readily be fixed over the radar display so that the chart position of the craft is immediately apparent from the position of the centre of rotation of the trace on this transparency.

In a modification of the above described embodiment, instead of using fixed deflector coils 60, 61 in the display, deflection means may be provided which are rotatably mounted so that they can be rotated around the neck of the cathode ray tube. Such an arrangement is shown diagrammatically in Figure 6 in which is shown a cathode ray tube 100 having two deflector means 101, 102 (e.g. coil systems) which are separately rotatable around the neck of the tube. These two deflector means may be set manually so that each tends to produce deflection of the centre of rotation of the trace along a direction corresponding to the direction of one of the lines of constant co-ordinate value of the position fixing system. The two deflector means are provided with gear wheels 103, 104, which engage with pinions 105, 106 respectively and these pinions are coupled to the two inputs of a differential gear 107 to rotate an output shaft of the differential into a position corresponding to the angle between the setting of the two deflector means. This arrangement of the deflection system enables a simpler form of electro-mechanical computer to be employed than has been described with reference to Figures 3 and 4.

Figure 5:
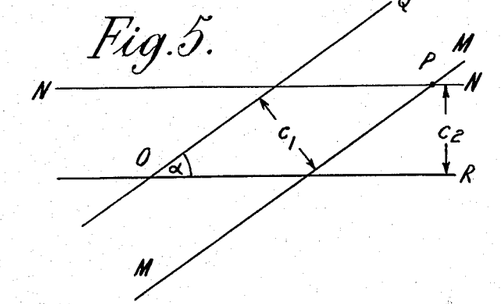
Figure 5 is an explanatory graphical diagram.

Referring to Figure 5 there is shown diagrammatically two co-ordinate lines MM and NN representative of the co-ordinates of a point P in the co-ordinate system of the position fixing system. The corresponding datum lines through the origin O are shown at OQ and OR respectively and it will readily be seen that if $C_1$ and $C_2$ are two co-ordinate values with respect to the co-ordinate axes of the position fixing system, then the required deflections in the directions of the co-ordinate lines required from the deflector systems 101, 102 will be $S_1$ and $S_2$ respectively, where $S_1$ is proportional to $C_2$ cosec $\alpha$ and $S_2$ is proportional to $C_1$ cosec $\alpha$. To effect this computation, output from the differential gear 107 is fed as indicated diagrammatically by the dash line 108 to a shaft 109 driving a crank pin 110 which engages in a slotted member 111. This slotted member is movable transversely to the direction of the slot and carries a ball 112 of a ball and disc multiplier 113. The ball is rotated by means of a shaft 114 to drive a disc 115. The shaft 109 is so positioned with respect to the disc that the output rotation of the disc 115 corresponds to the rotation of the shaft 114 multiplied by the cosecant of the angular position of the shaft 109, that is to say the cosecant of the angle between the setting of the deflector means 101, 102. It will thus readily be seen that, by using two ball and disc multipliers 113 each controlled from the output of the differential gear 107, shaft rotations of the two discs will be obtained proportional to the required currents to be fed to the deflector coils of deflector systems 101, 102. These currents may be produced by adjustable potentiometers as described with reference to Figure 4.

Figure 6:
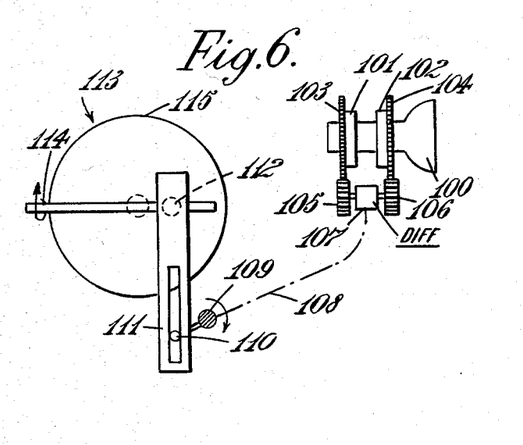
Figure 6 is a diagram similar to Figure 4 but illustrating an alternative arrangement.

In the arrangement of Figure 6, two separate rotatable deflector means are provided for effecting the required displacements of the centre of rotation of the trace for the radar display. It will be noted that such an arrangement permits of the use of a relatively simple form of computing mechanism for converting the shaft rotations representative of the position of the craft with respect to the co-ordinates of the radio position fixing system into signals for application to the deflector means. It will be appreciated that the deflector means might be further simplified by the provision of only a single rotatable deflector system but that this would necessitate the conversion of the radio position fixing system information into polar co-ordinates to provide the required signals for the deflector means. The use of a single deflector means facilitates the alternative stabilisation from a speed measuring device (e.g. a ship's log) and a compass instead of the radio position-fixing system, as may be desirable, for example, when the craft is out of the coverage area of the radio position-fixing system. In this case it is merely necessary to control the angular position of the deflector means from the compass (possibly manually) and to feed into the deflector system signals representative of the integral with respect to time of the measured speed. In the simplest form, it is merely necessary to drive the potentiometer or other deflection signal controlling means at a rate proportional to the measured speed.

The signals required may be put into the form:

$$\sin \beta = \frac{C_2 \sin \alpha_1 - C_1 \sin \alpha_2}{\sqrt{(C_2 \cos \alpha_1 - C_1 \cos \alpha_2)^2 + (C_2 \sin \alpha_1 - C_1 \sin \alpha_2)^2}}$$

$$\cos \beta = \frac{C_2 \cos \alpha_1 - C_1 \cos \alpha_2}{\sqrt{(C_2 \cos \alpha_1 - C_1 \cos \alpha_2)^2 + (C_2 \sin \alpha_1 - C_1 \sin \alpha_2)^2}}$$

where $\beta$ is the direction in which the deflection means must be oriented, with respect to north, $C_1$ and $C_2$ are the radio position fixing system co-ordinate values corrected to display scale, $\alpha_1$ and $\alpha_2$ are respectively the angles which the position fixing system lines of constant co-ordinate values make with respect to the reference direction of the display e.g. north, $$\text{and } R = \frac{C_1}{\cos \alpha_1 \sin \beta - \sin \alpha_1 \cos \beta}$$

where R is the signal required to energise the deflection means.

This computation may conveniently be effected by a mechanical analogue computer which may be generally similar to that shown in Figure 3 but, instead of having two fixed guides 80, 81 with their associated guide members, the pin 78 is arranged to extend through the radially extending slot in a pivoted member which is constructed as a guide with a guided member in a manner similar to the guide 80 and guided member 82. The position of the pin along the slot is thus converted into a shaft rotation which is representative of the radial distance forming one of the required polar co-ordinates and the angular position of the pivoted member, which represents the other required co-ordinate may be converted into an angular rotation of another shaft.

The first shaft may then be coupled to a potentiometer to control the current through a deflector coil system whilst the second shaft may be coupled, through a remote-position servo mechanism if necessary, to control the angular position of the deflector means about the neck of the cathode ray tube.

Figure 7:
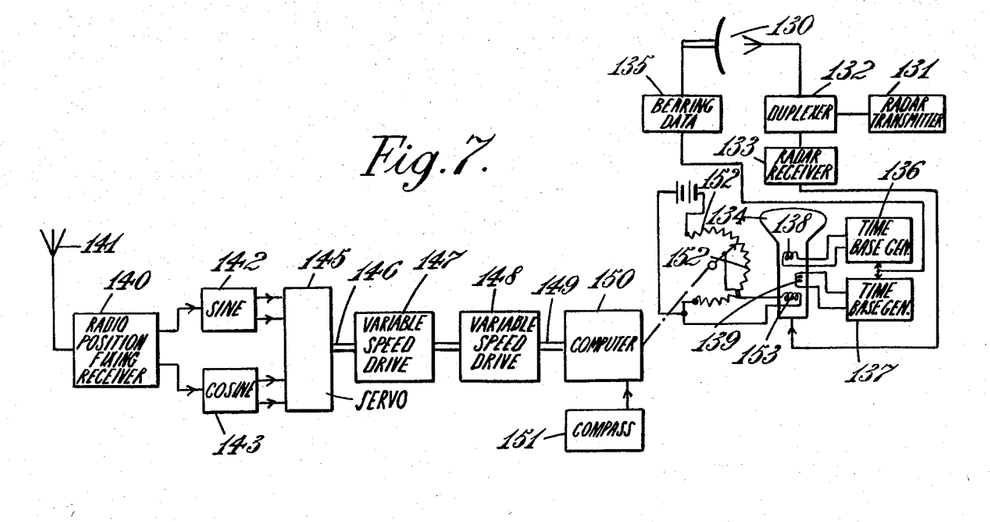
Figure 7 is a block diagram illustrating another combination of radar apparatus and radio position fixing system for stabilising a radar display.

In all the above described embodiments, the radar display has been a compass datum stabilised display but, as previously explained, a relative display may also be stabilised. In a relative display, the ship's heading is a fixed direction on the display screen and the track of the craft will only deviate from this direction by a small angle depending upon the side-ways drift. The deflection of the radar display on the display screen may be effected, in the case of a relative display, in a manner similar to that described for azimuth stabilised displays, the bearing data from a compass being fed into the computing mechanisms so as to effect the necessary correction. However, it may often be possible to ignore the sideways drift and thus to assume that the required direction of deflection, so long as the craft remains on one heading, is always in a fixed radial direction on the display screen thereby permitting of a much simpler arrangement. One embodiment of such an arrangement is shown in Figure 7 in which there is illustrated radar apparatus comprising a scanning aerial 130 fed with radio frequency pulse signals from a transmitter 131 by a duplexer 132. Signals received by the aerial are fed through the duplexer to a receiver 133 and thence are fed to modulate the beam of a cathode ray display tube 134. A bearing data transmitter 135 controls scanning signals produced by two time base generators 136, 137 for feeding suitable sawtooth waveform signals to scanning deflector coils 138, 139 for effecting the scanning deflection of the cathode ray beam so as to provide a plan position display on the screen of the tube. The radio position-fixing system which will again be assumed to be a hyperbolic phase comparison radio navigation system, is illustrated diagrammatically as comprising a receiver 140 coupled to an aerial 141. In this arrangement, use is made of only one position coordinate produced by the navigation receiver 140. The sine and cosine signals corresponding to the phase angle representative of this co-ordinate are fed respectively to two phase splitters 142, 143 and thence into a servo-mechanism 145 so as to produce (in a manner similar to that employed in Figure 1) a rotation of a shaft 146 representative of the measured phase relationship. This shaft rotation is changed in ratio by variable speed drives 147, 148 corresponding respectively to the variable speed drives 30 and 34 of Figure 1 so as to produce a rotation of an output shaft 149 which is in a fixed ratio to the movement of the craft in the selected coordinate direction. This shaft rotation is then changed in ratio by a suitable computing mechanism 150 controlled by a compass 151 so as to convert the rotation of the shaft 149 into a rotation of an output shaft corresponding to the movement of the craft in the direction of the heading of the craft. It will be appreciated that this computation is merely the multiplication of the input rotation by the secant of the angle between the direction of the heading as determined by the compass and the direction corresponding to the co-ordinate values determined by the navigation receiver and thus a ball and disc multiplier similar to that shown in Figure 6 may be employed. The output from the computer is arranged to control a potentiometer 152 which in turn controls the current through a deflector coil system 153 for deflecting the centre of rotation of the trace on the display tube 134. This deflector coil 153 may be made adjustable in position so that it can be set to a suitable position on one or other side of the ship's heading to correct for drift, or if drift can be ignored, the deflector coil may be fixed.

As has been described with reference to compass-datum stabilised displays, provision may be made in relative displays for stabilisation from a speed measuring device for use when the craft is out of range of the radio position fixing system and, in the above described arrangement for a relative display, it is merely necessary to control the deflection current at a rate dependent on the measured speed.

In a relative display stabilised by means of a radio position fixing system as described above, the cathode ray display tube may be rotated as is described in United States application No. 596,665 so that echoes from fixed objects will remain in fixed positions on the screen and hence will not smudge even if the direction of heading of the craft varies, for example due to yawing of the craft.

I claim:

1. In combination in a mobile craft; radar apparatus having a directional scanning antenna and a cathode ray tube plan position indicator scanned in synchronism with the scanning by the antenna, deflection means for deflecting the beam of the cathode ray tube, a radio position fixing system arranged to provide an output in accordance with the changes in position of the craft, and means controlled by said output for controlling said deflection means to stabilize the display against displacement thereof on the cathode ray tube screen due to motion of the craft.

2. In combination in a mobile craft; radar apparatus having a directional scanning antenna and a cathode ray display tube scanned in synchronism with the scanning by the antenna to provide a plan position display, a compass arranged to stabilize said display in bearing, deflector means for deflecting the beam of the cathode ray tube, a radio position fixing system arranged to provide an output in accordance with the changes in position of the craft, and means controlled by said output for energizing said deflection means to stabilize the display against displacement thereof on the cathode ray tube screen due to motion of the craft.

3. In combination in a mobile craft; radar apparatus having a directional scanning antenna and a cathode ray display tube scanned in synchronism with the scanning by the antenna to provide a plan position display, a compass arranged to stabilize said display in bearing, two fixed beam deflectors for deflecting the cathode ray beam respectively in two different directions across the screen of the tube, a radio position fixing system arranged to provide outputs representative of the coordinate position of the craft, computing means for converting said outputs into two signals representative of position of the craft in a Cartesian coordinate system, and means controlled by said signals for energizing said beam deflectors to stabilize the display against displacement thereof on the cathode ray tube screen due to motion of the craft.

4. In combination in a mobile craft; radar apparatus having a directional scanning antenna and a cathode ray display tube scanned in synchronism with the scanning by the antenna to provide a plan position display, a compass arranged to stabilize said display in azimuth, two beam deflectors separately rotatably mounted with respect to the cathode ray tube for deflecting the cathode ray beam respectively in two separately adjustable directions across the screen of the tube, a radio position fixing system arranged to provide two outputs representative of the co-ordinate position of the craft in a Cartesian co-ordinate system, and means controlled by said outputs for energizing said beam deflectors respectively in accordance with said two outputs, whereby, by positioning the beam deflectors in accordance with the directions of the positional coordinate system, the deflectors stabilize the display against displacement thereof on the cathode ray tube screen due to motion of the craft.

5. In combination in a mobile craft; radar apparatus having a directional scanning antenna and a cathode ray display tube scanned in synchronism with the scanning by the antenna to provide a plan position display, a compass arranged to stabilize said display in bearing, a mounting member rotatable about said cathode ray tube, beam deflector means on said mounting member for deflecting the beam of the cathode ray tube in a radial direction, a radio position fixing system arranged to provide outputs representative of the position of the craft, computing means coupled to said radio position fixing system for converting said outputs into outputs representative of the distance and bearing of the craft from a datum position, means for controlling the angular position of said mounting member in accordance with the output from said computing means representative of the bearing of the craft from the datum position, and means controlled by the output of said computing means representative of the distance from the datum position for energizing said deflector means in accordance with that output to stabilize the display against displacement thereof on the cathode ray tube screen due to motion of the craft.

6. In combination in a mobile craft; radar apparatus having a directional scanning antenna and a cathode ray display tube scanned in synchronism with the scanning by the antenna relative to the craft to provide a relative plan position display, deflection means for deflecting the beam of the cathode ray tube, which deflection means are mounted for rotation about the axis of the tube, a compass, means controlled by said compass for rotating the deflection means in accordance with changes in the heading of the craft, a radio position fixing system arranged to provide an output in accordance with changes in the position of the craft, and means controlled by said output for energizing said deflection means in accordance with such changes in position to stabilize the display against displacement thereof due to the motion of the craft along its track.

7. In combination in a mobile craft; radar apparatus having a directional scanning antenna and a cathode ray display tube scanned in synchronism with the scanning by the antenna relative to the craft to provide a relative plan position display, a member rotatable about the axis of said tube, two beam deflectors for deflecting the beam of the cathode ray tube in different directions fixedly mounted on said member, a compass, means controlled by the said compass for rotating said member in accordance with changes in the heading of the craft, a radio position fixing system arranged to provide outputs in accordance with changes in the position of the craft, computing means for converting said outputs into signals representative of the co-ordinate position of the craft in a co-ordinate system having axes defined by the two bearings on the display of the two directions of deflection effected by said beam deflectors, and means feeding said signals to said beam deflectors to stabilize the display against displacement thereof due to motion of the craft along its track.

8. In combination in a mobile craft; radar apparatus having a directional scanning antenna and a cathode ray display tube scanned in synchronism with the scanning by the antenna relative to the craft to provide a relative plan position display, two beam deflectors rotatable about and separately adjustable angularly about the axis of said tube for deflecting the beam of the tube, means for rotating both said beam deflectors about said axis in accordance with changes in the heading of the craft, a radio position fixing system arranged to provide outputs in accordance with changes in the co-ordinate position of the craft, and computing means for feeding to the beam deflectors signals derived from said outputs in accordance with the angular settings of the beam deflectors to stabilize the display against displacement thereof due to the motion of the craft along its track.

9. In combination in a mobile craft; radar apparatus having a directional scanning antenna and a cathode ray display tube scanned in synchronism with the scanning by the antenna relative to the craft to provide a relative plan position display, deflection means for deflecting the beam of the cathode ray tube, which deflection means are mounted for rotation about the axis of the tube, a radio position fixing system arranged to provide a first output in accordance with changes in the position of the craft and a second output representative of the heading of the craft, means responsive to said second output for rotating the deflection means in accordance with the changes in the heading of the craft, and means controlled by said first output for energizing said deflection means in accordance with the changes in position of the craft to stabilize the display against displacement thereof due to the motion of the craft along its track.

10. In combination in a mobile craft; radar apparatus having a directional scanning antenna and a cathode ray display tube scanned in synchronism with the scanning by the antenna relative to the craft to provide a relative plan position display, deflection means for deflecting the beam of the cathode ray tube, which deflection means are mounted for rotation about the axis of the tube, a compass, means controlled by said compass for rotating the deflection means in accordance with changes in the heading of the craft and for rotating the cathode ray tube about its axis so as to stabilize on the screen of the tube the position of target responses as the craft turns, a radio position fixing system arranged to provide an output in accordance with changes in the position of the craft, and means controlled by said output for energizing said deflection means in accordance with such changes in position to stabilize the display against displacement thereof due to the motion of the craft along its track.

11. In combination in a mobile craft; radar apparatus having a directional scanning antenna and a cathode ray display tube scanned in synchronism with the scanning by the antenna relative to the craft to provide a relative plan position display, a single auxiliary deflection means for deflecting the beam of the cathode ray tube radially, a radio position fixing system arranged to provide an output representative of the changes in position of the craft along its track, and means controlled by said output for energizing said deflection means in accordance with the distance travelled along the track to stabilize the display against displacement thereof on the screen of the tube due to the motion of the craft along its track.

12. The combination as claimed in claim 11 wherein said single auxiliary deflection means is fixedly mounted to effect deflection of the cathode ray beam in the direction corresponding to the heading of the craft.

13. The combination as claimed in claim 11 wherein said single deflection means is adjustable in position whereby it may be set to deflect the cathode ray beam on the screen radially in the direction corresponding to the track of the craft.

14. In combination in a mobile craft; radar apparatus having a directional scanning antenna and a cathode ray display tube scanned in synchronism with the scanning by the antenna relative to the craft to provide a relative plan position display, a single auxiliary deflection means for deflecting the beam of the cathode ray tube radially, a radio position fixing system arranged to provide two outputs representative of two co-ordinates defining the co-ordinate position of the craft, computing means for deriving from said two outputs a single output representative of the distance travelled by the craft along its track, and means controlled by said single output for energizing said deflection means in accordance with said single output to stabilize the display against displacement thereof on the screen of the tube due to the motion of the craft along its track.

15. In combination in a mobile craft; radar apparatus having a directional scanning antenna and a cathode ray tube scanned in synchronism with the scanning by the antenna relative to the craft to provide a relative plan position display, a single auxiliary deflection means for deflecting the beam of the cathode ray tube radially in the direction corresponding to the heading of the craft, a radio position fixing system arranged to provide an output representative of the change in one co-ordinate direction of the position of the craft, a compass for determining the heading of the craft, computing means controlled by said compass for deriving from the output of the radio position fixing system an output representative of the distance travelled by the craft in the direction of its heading, and means controlled by the output of the computing means for energizing said deflection means so as to deflect the cathode ray beam radially in the direction corresponding to the heading of the craft to stabilize the display against displacement thereof on the screen of the tube due to the motion of the craft along its track.

16. In combination on a mobile craft; radar apparatus having a directional scanning antenna and a cathode ray tube in which a trace is scanned in synchronism with the scanning by the antenna to produce a plan position display, auxiliary deflection means for deflecting the cathode ray beam to displace the display on the screen of the tube, a radio position fixing system providing output signals representative of the position of the craft, and means for applying deflection signals to said auxiliary deflection means in accordance with said output signals to stabilize the display against displacement thereof on the screen of the tube due to the motion of the craft.

17. In combination on a mobile craft; radar apparatus having a cathode ray tube plan position display, auxiliary deflection means for deflecting the cathode ray beam to displace the display on the screen of the tube, a radio position fixing system providing output signals representative of changes in the position of the craft, and computing means for deriving from said output signals and for feeding to said auxiliary deflection means deflection signals to stabilize the display against displacement thereof on the screen of the tube due to the motion of the craft.

18. In combination on a mobile craft; radar apparatus having a cathode ray tube display with compass stabilizing means for providing an azimuth stabilized plan position display, auxiliary deflection means for deflecting the cathode ray beam to displace the display on the screen of the tube, a radio position fixing system providing outputs representative of the position of the craft, and means responsive to said outputs for applying deflection signals to said auxiliary deflection means to stabilize the display against displacement thereof on the screen of the tube due to the motion of the craft.

19. In combination on a mobile craft; radar apparatus having a directional scanning antenna and a cathode ray display tube scanned in synchronism with the scanning by the antenna relative to the craft to provide a relative plan position display, auxiliary deflection means for deflecting the cathode ray beam to displace the display on the screen of the tube, a radio position fixing system providing outputs representative of the position of the craft, a compass for determining the heading of the craft, and computing means controlled by said compass for feeding to said auxiliary deflection means deflection signals derived from said outputs in accordance with the heading of the craft to stabilize the display against displacement thereof in the direction of the heading of the craft due to the motion of the craft.

20. In combination on a mobile craft; radar apparatus having a cathode ray tube plan position display, auxiliary deflection means for deflecting the cathode ray beam to displace the display on the screen of the tube, a hyperbolic radio position fixing system providing outputs representative of the position of the craft, and electro-mechanical means adjustable in accordance with the angle of intersection of the hyperbolic position lines at the position of the craft and the distances corresponding to unit changes in the hyperbolic co-ordinates for applying deflection signals to said auxiliary deflection means in accordance with said output signals to stabilize the display against displacement thereof on the screen of the tube due to the motion of the craft.

21. The combination as claimed in claim 20 wherein said auxiliary deflection means comprises two beam deflectors for deflecting the cathode ray beam in different radial directions and wherein said radio position fixing system is a phase comparison system having two rotatable output members the angular rotations of which are representative of the changes in position of the craft in two co-ordinate directions, and wherein said electro-mechanical means comprises a mechanical computer coupled to said rotatable output members to control two electrical signal generators in accordance with the co-ordinates defining movement of the craft in a co-ordinate system corresponding to the directions of deflection of said beam deflectors and wherein said signal generators are coupled to said beam deflectors.

References Cited in the file of this patent

UNITED STATES PATENTS

| | | |
|---|---|---|
| 2,701,352 | Kingdon et al. | Feb. 1, 1955 |
| 2,724,099 | Harrison | Nov. 15, 1955 |
| 2,728,075 | Sunstein | Dec. 20, 1955 |
| 2,731,633 | O'Kane et al. | Jan. 17, 1956 |
| 2,804,613 | Haworth | Aug. 27, 1957 |